Nov. 24, 1936.  D. TENDLER  2,062,073
GATE LATCH
Filed Oct. 18, 1935
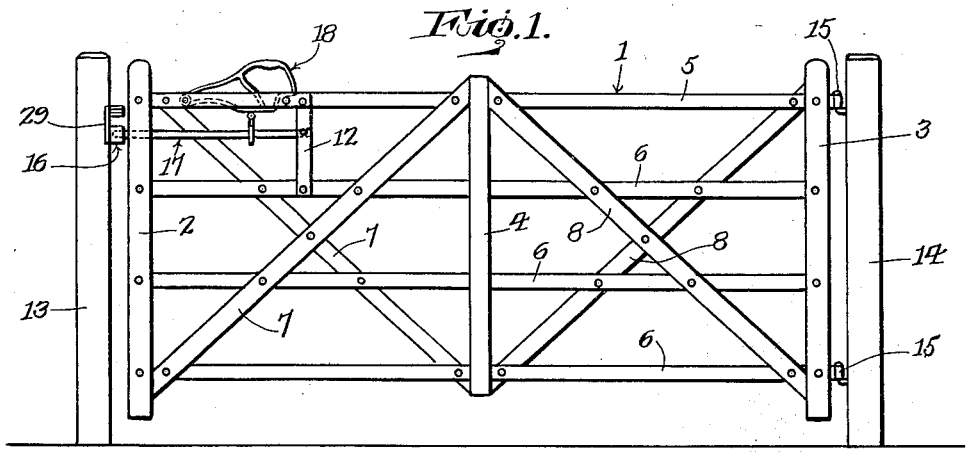
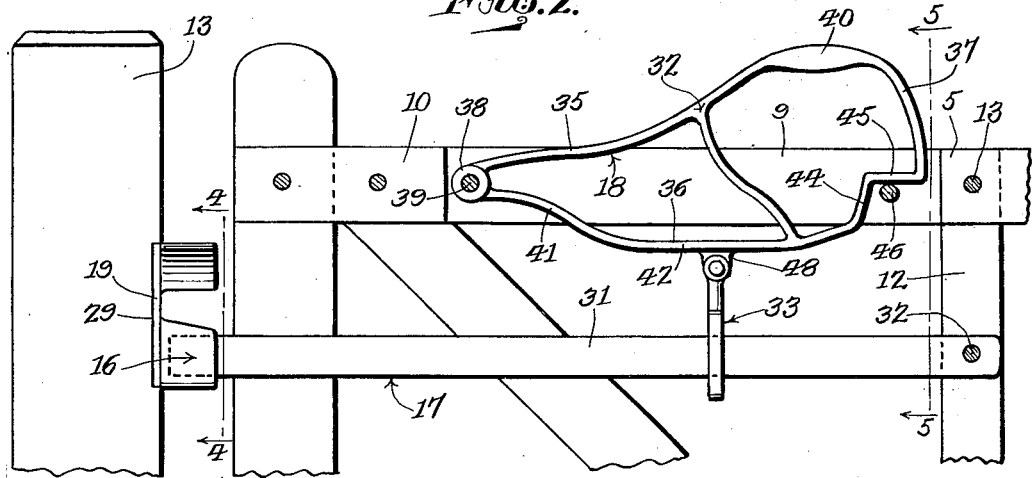
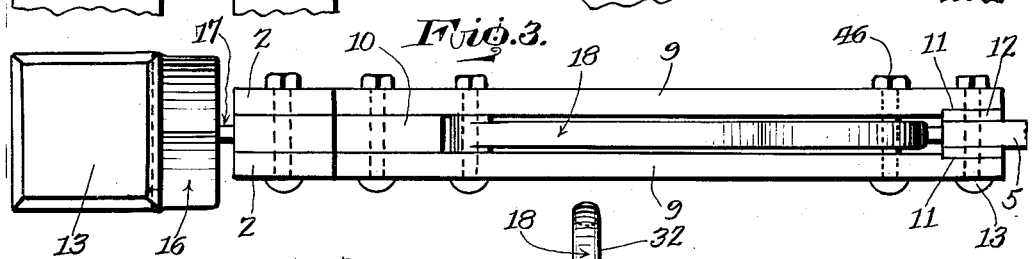
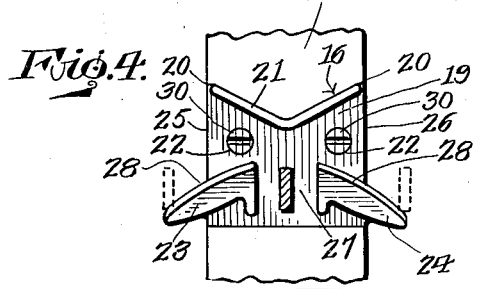
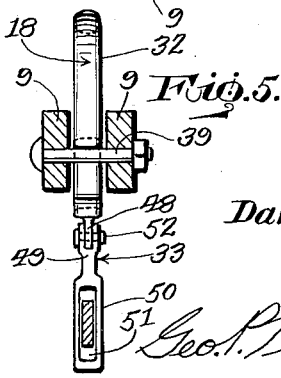
Inventor
David Tendler
Geo. P. Kimmel
Attorney Patented Nov. 24, 1936

2,062,073

UNITED STATES PATENT OFFICE 2,062,073

GATE LATCH

David Tendler, Malvern, Pa.

Application October 18, 1935, Serial No. 45,643

4 Claims. (Cl. 292—233)

This invention relates to a gate latch and has for its object to provide, in a manner as hereinafter set forth, a latch so constructed and arranged relative to the gate to enable a person upon a horse, without dismounting, to shift the latch to released position and respectively open and latch the gate by a pushing action on the latter in opposite directions.

A further object of the invention is to provide, in a manner as hereinafter set forth, a gate latch so constructed and arranged relative to the gate acting to automatically latch the gate closed by a push on the gate, when open from either side thereof.

A further object of the invention is to provide, in a manner as hereinafter set forth, a gate latch so constructed and arranged relative to the gate to permit of the latter being pushed forwardly to open and pushed rearwardly to be automatically latched closed.

Further objects of the invention are to provide, in a manner as hereinafter set forth, a gate latch capable for use for farm gates and, when used in such connection, preventing the opening of the gate by horses or cattle, strong, durable, compact, readily assembled and installed relative to the gate body and a gate post, thoroughly efficient when used, and comparatively inexpensive to manufacture.

To the above ends essentially and to others which may hereinafter appear, the invention consists of the novel construction, combination and arrangement of parts as will be more specifically referred to and are illustrated in the accompanying drawing wherein is shown the preferred embodiment of the invention, but it is to be understood that changes, variations, and modifications may be resorted to which fall within the scope of the invention as claimed.

In the drawing:

Figure 1 is a side elevation of a gate showing the adaptation therewith of a gate latch in accordance with this invention, Figure 2 is a fragmentary view in vertical section of the gate with the latch, in accordance with this invention applied thereto.

Figure 3 is a fragmentary view in top plan of the gate with the latch, in accordance with this invention, applied thereto, Figure 4 is a side elevation of the keeper element of the latch, and Figure 5 is a section on line 5—5, Figure 2.

Referring to the drawing, 1 indicates a gate body of skeleton form having an outer end pair of spaced parallel vertical bars 2, an inner end pair of spaced parallel vertical bars 3, only one shown, an intermediate pair of spaced vertical bars 4, only one shown, a top bar 5, lower bars 6, a pair of upstanding oppositely inclined outer bars 7 and a pair of upstanding oppositely inclined outer bars 8. The bars 5, 6 are arranged in superposed relation. The bar 5 is of less length than bars 6 and extends between and is secured to the bars of the pairs of bars 3, 4. The bars 6 extend between and are secured to the bars of the pairs of bars 2, 3, 4. The bars 7 are arranged on the side faces of and are secured to the bars 5, 6 between the pairs of bars 2, 4. The bars 8 are arranged in the side faces of and secured to the bars 5, 6 between the pairs of bars 3, 4. Secured to the bar 5 at that end thereof which is spaced from the pair of bars 2 is a pair of parallel short bars 9 which are also secured against the side faces of a filler strip 10 positioned between, anchored to and extended inwardly from the pair of bars 2. The inner end of the inner side faces of the bars 9 are rabbeted as at 11. Arranged against the rabbets and the side faces of the bar 5 is a pair of depending short spaced parallel bars 12 which, at their lower ends, are anchored to the side faces of the upper one of the bars 6. The bars 5, 9, and 12 are secured together by the holdfast means 13, Figure 3. One of the bars 7 is secured to one of the bars 9. The gate body 1 is arranged between a pair of spaced parallel posts 13, 14, and is removably hinged, at its inner end to the post 3, as at 15. The bars 9, filler strip 10 and bars 12 form elements of the gate latch. The latter also includes a keeper element 16, a latching member 17 coacting with the element 16, and a combined handle and releasing element 18 for the latching member 17.

The element 16 is adapted to be secured in the outer side face of post 13 and it consists of an upstanding plate 19 having a V-shaped top edge 20, an outwardly directed V-shaped stop flange 21 flush with and of less length than edge 20, openings 22 in proximity to flange 21, and a pair of oppositely disposed spaced inner endwise aligning combined guide and lifter members 23, 24 for the latching member. The members 23, 24, for the major portion of their length, are integral with and are arranged in proximity to the bottom of plate 19. The members 23, 24 are adjacent each side of the vertical median and extend beyond the side edges 25, 26 respectively of plate 19. The members 23, 24 coact to form a latching member receiving space 27. The inner ends of members 23, 24 constitute stops to prevent the shifting of the latching member from element 16 when such member is in latching position, as shown in Figure 4; that is, when the outer end of the latching member is extended into space 27. Each of the combined guide and lifting members has its top 28 of the same width as that of flange 21. The top 28 inclines upwardly from its outer to its inner end and is upon a slight curve. The ends of the flange 21 are positioned inwardly adjacent to the side edges 25, 26 of the plate 19. The latter seats in a groove 29 formed in the outer side face of post 13. Countersunk holdfast devices 30 extend through openings 22 and engage in post 13 for anchoring element 16 thereto. The members 23, 24 extend beyond the front and rear side faces of the post 13. The flange 21 is for the purpose of retaining the latching member in the keeper element as such member moves to latching position. The inner ends of members 23, 24 are of materially greater height than the outer ends thereof and form the side walls of space 27.

The latching member 17 is in the form of an elongated flat rectangular bar 31 disposed on its lower lengthwise edge. The bar 31 is arranged between the pair of bars 2 and the bars 12. The inner end of bar 31 is pivotally connected, as at 32, to the bars 12. The bar 31 is of a length to extend outwardly from the pair of bars 2 to engage in the element 16.

The combined handle and releasing element 18 is arranged between, extends above and depends below the bars 9. The element 18 consists of an upper section 33 and a lower section 34 arranged substantially centrally of the bottom of section 33. The latter provides a handle member and is of skeleton form. The section 34 forms a lifter for the latching member. The section 33 consists of a top part 35, a bottom part 36, a rear end part 37 and an annulus 38 of materially less diameter than the height of end part 37. The annulus 38 provides the front end of element 18 and is revolubly mounted on a pivot 39 carried by the bars 9. The forward portions of the parts 35, 36 extend toward and merge into the top and bottom of the inner side of the outer edge of the annulus 38. The rear end part 37 curves forwardly from the lower to its upper end and merges at its upper end into the rear end of the part 35. The lower end of part 37 merges into the rear end of part 36. The part 35 extends upwardly at an inclination from its front to its rear end and is of compound curvature. The rear end terminal portion of part 35 is of substantially elliptical form, as at 40, to provide a hand grip. The part 36 includes a stretch 41 of downwardly inclined compound curvature, a straight stretch 42 merging at its forward end into the rear end of stretch 41, an upwardly inclined stretch 43 merging at its lower end into the rear end of stretch 42, an upstanding rearwardly inclined stretch 44 merging at its rear end into the upper end of stretch 43, and a straight stretch 45 merging at its forward end into the upper end of stretch 44. The stretch 41 merges at its forward end into annulus 38. The straight stretch 45 constitutes an abutment which coacts with a stop 46 carried by the bars 9 for arresting the lowering movement of the rear end portion of element 18. The rear end of stretch 45 merges into the lower end of part 37. The parts 35, 36 are connected together, intermediate their ends, by a curved brace part 47 which is integral therewith and arranged forwardly of said hand grip 40. The straight stretch 42 of part 36 is formed with a depending apertured lug 48. The contour of the section 32 of element 18 is approximately ovoidal. The section 33 includes an upstanding bifurcated apertured shank 49 which straddles and depends from lug 48 and a depending rectangular part 50 provided with a rectangular opening 51. The lower end of shank 49 merges into the upper end of part 50. The shank 49 is pivotally suspended from lug 48 by a pivot 52. The part 50 forms a loop for the passage of and couples the latching element 17 to the element 18 whereby on the elevating of the latter on its pivot the latching member will be elevated to release the gate body to enable it to be pushed to open position. The length of opening 51 is greater than the width of the latching member to prevent any possibility of such member binding against part 50 of the section 33 of element 18.

The member 23 or 24 acts to guide and lift the latching member to enter the space 27 when the gate is pushed in a direction to close it, and as the members 23, 24 are oppositely disposed the gate may be closed from either side thereof. The members 23, 24 also provide for the automatic latching of the gate closed, when the latter is pushed in a direction to close it.

To open the gate, the element 18 is elevated and which in turn will raise the latching member clear of space 27 in the keeper element whereby the gate will then be unlatched, then the gate is pushed forwardly to open. The foregoing action is had without one dismounting from the horse. After the rider has passed through the gate, the latter is pushed rearwardly by the rider, without dismounting, to closed position and it will be automatically latched. Owing to the arrangement and construction of the members 23, 24 and their action upon the latching member, the gate, when pushed rearwardly, will not overrun the position in which it is to be disposed for closing.

What I claim is:

1. In a gate latch, a pivoted combined handle and pivoted latching member releasing element formed of an upper and a lower section, said upper section comprising a skeleton body formed of a top, bottom, a forward end and a rear end, said top and bottom being of greater length than the said ends, said rear end being of greater length than the forward end, said body increasing in width from its forward to its rear end, said forward end being in the form of an annulus for the passage of and for pivotally mounting said body on a pivot, said rear end having a part thereof, intermediate its ends providing a horizontally disposed abutment adapted to be disposed in the path of a stop for arresting the lowering movement of the rear end of said body to maintain the latter in a horizontal position and a lug depending from said bottom intermediate the ends of the latter; and said lower section consisting of a shank pivoted to and depending from said lug and merging into a loop which forms means to encompass the latching member to slidably connect the latter with said body whereby on the upward movement of said body said member will be released.

2. The invention as set forth in claim 1 having said body formed intermediate its ends with a diagonally disposed brace merging at its ends into the top and bottom of said body.

3. The invention as set forth in claim 1 having the top of said body of greater length than the bottom of the latter.

4. The invention as set forth in claim 1 having the top of said body provided with hand gripping means at the rear portion thereof.

DAVID TENDLER.